April 6, 1965 L. A. MEDLAR Re. 25,754

BATTERY CHARGERS WITH TIMING MEANS

Original Filed Sept. 27, 1960 2 Sheets-Sheet 1

INVENTOR
LEWIS A. MEDLAR

BY Arnold and Raylance

ATTORNEYS

INVENTOR
LEWIS A. MEDLAR

BY Arnold Ex Rogers

ATTORNEYS

United States Patent Office

Re. 25,754
Reissued Apr. 6, 1965

25,754
BATTERY CHARGERS WITH TIMING MEANS

Lewis A. Medlar, Oreland, Pa., by Fox Products Company, Philadelphia, Pa., a corporation of Pennsylvania Original No. 2,987,663, dated June 6, 1961, Ser. No. 58,663, Sept. 27, 1960. Application for reissue Nov. 8, 1962, Ser. No. 250,453
10 Claims. (Cl. 320—38)

Matter enclosed in heavy brackets [ ] appears in the original patent but forms no part of this reissue specification; matter printed in italics indicates the additions made by reissue.

This invention relates to battery chargers and more particularly to improvements in charging apparatus of the general type employed for charging storage batteries in service stations, garages, industrial installations and the like.

It has long been known to employ in storage battery chargers various types of automatic controls for terminating charging. Thus, it is common to employ a time switch which can be adjusted by the operator to interrupt charging automatically at the end of a selected period. Also, many types of chargers have been provided with special control circuits for terminating charging automatically in accordance with such variables as the temperature of the electrolyte of the battery being charged and the terminal voltage of the battery. In all such devices heretofore proposed, however, the control means has been so designed and constructed as to terminate charging upon occurrence of a predetermined condition, such as time, temperature or voltage, which is estimated, either by the operator or by the designer of the charger, to occur only after the charger has supplied the battery with an adequate charge, such estimate assuming that the battery is not defective.

With such prior art charging apparatus, the result of a complete cycle of charging operation on a given battery is either successful, in the sense that the battery reaches a satisfactory level of charge, or unsuccessful, in the sense that the battery is not adequately charged, even for practical purposes, when the charger is automatically de-energized. Under usual circumstances, the person operating the battery charger has little technical skill and is completely unable to estimate the actual condition of the battery. Accordingly, if the battery being charged does not come up to charge, the operator does not ordinarily know whether the battery is defective or can be successfully subjected to further charging. It is, of course, common practice to employ various types of battery testing apparatus, for use in conjunction with the battery charger, to aid the operator in estimating the condition of the battery. However, because the operator usually lacks technical skill, it is difficult to provide inexpensive testing apparatus which will allow the operator to properly handle all batteries in a simple, expedient and economical fashion.

A general object of the present invention is to provide a battery charger so constructed and arranged that it will not only be automatic in its charging operation but will also, as a result of its automatic action in charging the battery, clearly indicate to the operator what action should be taken with respect to the battery after charging has been terminated. In effect, chargers constructed in accordance with the present invention inform the operator whether the battery is in satisfactory condition after charging or should be subjected to certain specific further treatments.

Another object of the invention is to provide an automatic battery charger capable of satisfactorily charging storage batteries even though the conditions of the various batteries to be charged may vary widely.

A further object is to provide a battery charger of such nature as to require a minimum of skill on the part of the operator.

*Yet another object is to provide a battery charger including a timer adapted to control charger operation and effective to accomplish relative movement between a pointer and indicia in an inexpensive, but accurate, manner to indicate proper handling of the battery subsequent to termination of charging.*

In order that the manner in which these and other objects are attained in accordance with the invention can be understood in detail, reference is had to the accompanying drawings, which form a part of this specification, and wherein.

Figure 1:
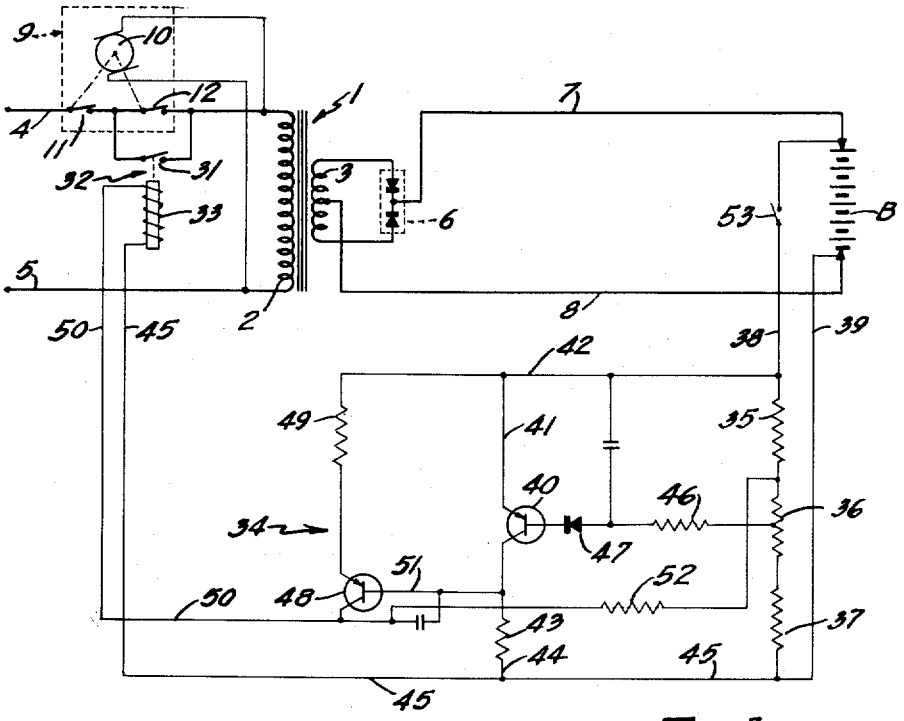
FIG. 1 is a schematic diagram of a battery charger constructed in accordance with one embodiment of the invention.

Referring now to the drawings in detail and first to FIG. 1 thereof, it will be seen that the battery charger here illustrated includes a transformer 1 having a primary winding 2 and a center tapped secondary winding 3. The terminals of primary winding 2 are connected to conductors 4 and 5 via which the charger can be connected to a suitable source of alternating current (not shown). A center-tapped rectifier, indicated generally at 6, is connected across the secondary winding 3. The charger is provided with leads 7 and 8 for connection to the positive and negative terminals, respectively, of the battery B to be charged, leads 7 being connected to the center tap of rectifier 6 and lead 8 being connected to the center tap of transformer secondary winding 3.

Figure 2:
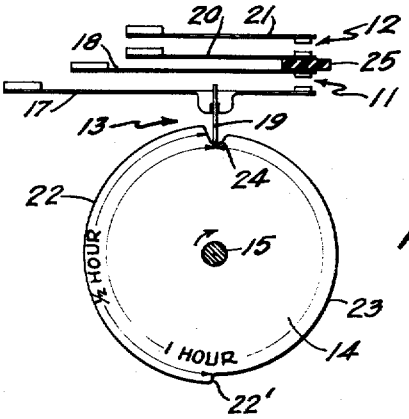
FIG. 2 is a fragmentary, simplified illustration of a time switch device employed in the battery charger of FIG. 1.

The apparatus employs a time switch device indicated generally at 9 and comprising a synchronous electric driving motor 10, a pair of single pole single throw switches 11 and 12 and conventional cam means, indicated generally at 13, FIG. 2, driven by motor 10 and constructed and arranged to maintain switches 11 and 12 closed only over definite time periods once the time switch has been adjusted manually to its "Start" position.

Referring to FIG. 2, it will be seen that the cam means 13 includes a single cam 14 connected to shaft 15, the shaft being rotated continuously by motor 10 in the direction indicated by the arrow in FIG. 2. Motor 10 is connected to one end of shaft 15 and a manually operated knob 16, FIG. 3, is fixed to the other end of the shaft, the arrangement being such that, while motor 10 is connected to drive the shaft positively whenever the motor is energized, shaft 15 can be rotated by knob 16 to manually adjust the angular position of cam 14.

As illustrated in FIG. 2, switch 11 can include two contact carrying spring arms 17 and 18, arm 17 carrying a cam follower 19, and switch 12 can include two contact carrying spring arms 20 and 21. Cam 14 includes a "high" arcuate peripheral surface portion 22, an "intermediate" arcuate peripheral surface portion 23 and a notch 24 constituting the "low" point of the cam. When follower 19 occupies notch 24, spring arms 17, 18, 20 and 21 are relaxed and switches 11 and 12 are both open. Rotation of cam 14 to bring follower 19 onto surface portion 22 causes follower 19 to be shifted radially to such an extent that both switches 11 and 12 are closed. Such closing action of the two switches results from a substantial distortion of spring arms 17, 18, 20 and 21 and from the fact that arm 18 of switch 11 and arm 20 of switch 12 are interconnected, at their contact-carrying ends, by an insulating member 25. During rotation of the cam, both switches 11 and 12 are maintained closed so long as follower 19 engages the "high" peripheral cam portion 22. As the shoulder 22′ at the end of portion 22 passes beneath follower 19, the spring forces applied by the contact arms cause follower 19 to shift radially inward into engagement with the "immedate" peripheral cam portion 23. The extent of such shifting movement of follower 19 is adequate to allow switch 12 to open, but switch 11 remains closed so long as follower 19 engages cam portion 23. As the end of cam portion 23 passes beneath follower 19, the latter is shifted into notch 24, resulting in opening of switch 11. It will thus be seen that shaft 15 can be rotated manually, by manpulation of knob 16, to bring follower 19 to the advance end of cam portion 22 and so accomplish closing of both switches 11 and 12. Rotation of shaft 15, by motor 10, through substantially one complete revolution, will then cause follower 19 to first follow cam portion 22, then follow cam portion 23 and then be engaged in notch 24, assuming that the motor remains energized.

Figure 3:
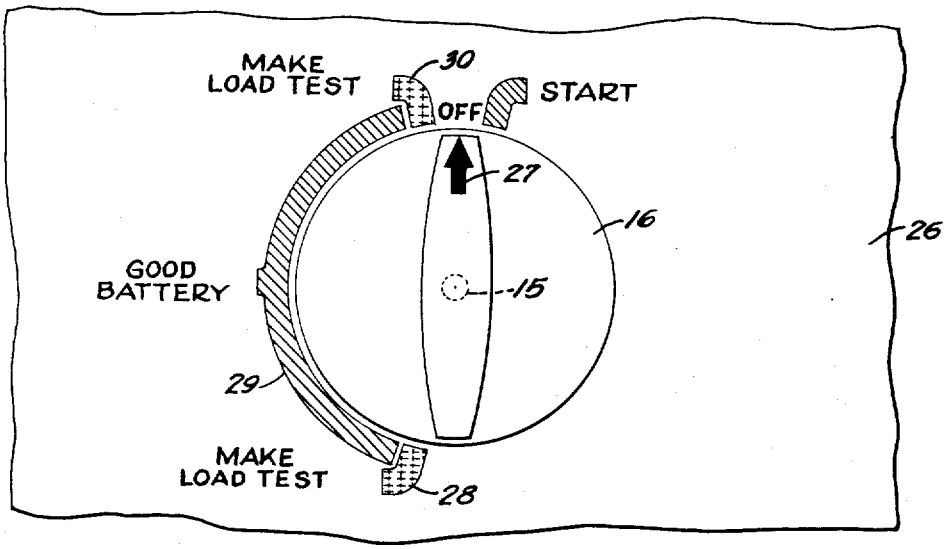
FIG. 3 is a fragmentary front elevational view of a portion of the battery charger of FIG. 1, including the time switch adjusting knob and a portion of the battery charger casing bearing indicia with which the knob cooperates.

As seen in FIG. 3, knob 16 is located outside of the casing of the battery charger and adjacent to a face portion 26 of the casing. The knob is provided with an indicating pointer 27, directed radially with respect to shaft 15. Casing portion 26 is provided with special indicia to instruct the operator not only in the operation of the battery charger but also in the proper handling of the battery being charged. Thus, in addition to the usual "Off" and "Start" indications, as shown, casing portion 26 is provided with colored areas 28, 29 and 30, each with an appropriate legend. Colored area 28 is a narrow area so disposed as to be indicated by pointer 27 when the time switch has operated through the first, shorter time period. In other words, when shaft 15 has been rotated from "Start" by motor 10 until follower 19 just passes shoulder 22′, pointer 27 indicates area 28.

Area 29 extends in arcuate fashion through that range of travel of pointer 27 which will occur during the balance of the second, longer time period remaining after follower 19 passes shoulder 22′, assuming that motor 10 remains energized.

Area 30 is a narrow area located at the position which will be occupied by pointer 27 at the end of the second, longer time period. Thus, when follower 19 enters notch 24, pointer 27 indicates colored area 30.

Switches 11 and 12 are connected in series in conductor 4 so as to control alternating current flow to the primary winding 2 of transformer 1. Connected in parallel with switch 12 are the contacts 31 of a control relay, indicated generally at 32, having an actuating winding 33 connected to be energized in accordance with the terminal voltage of battery B by the voltage responsive actuating circuit indicated generally at 34. As will be described hereinafter in detail, circuit 34 is effective to energize winding 33 of relay 32, maintaining contacts 31 closed to shunt switch 12, so long as the terminal voltage of battery B is below a predetermined level. Motor 10 is connected between conductors 4 and 5, as shown, so that the motor is energized so long as both switches 11 and 12, or both switch 11 and relay contacts 31, are closed.

Assuming that knob 16 has been adjusted to "start" position, with follower 19 engaging cam portion 22 so that both switches 11 and 12 are closed, and that the terminal voltage of battery B is below that predetermined value to which circuit 34 is to respond, so that contacts 31 are closed, then charging will proceed so long as switch 11 and either or both of switch 12 and contacts 31 are closed. At the end of the first predetermined time period, defined by cam portion 22, switch 12 is opened. If the contacts 31 remain closed, then charging continues. If contacts 31 are open, however, as a result of battery B having reached the predetermined terminal voltage within the first predetermined time period, charging is terminated by opening of switch 12. At this time, indicating pointer 27 on knob 16 points to colored area 28 on casing face portion 26, area 28 being labeled "Make Load Test."

The first predetermined time period may, for example, be set at ½ hour, and the charging rate of the circuit of FIG. 1 such that most batteries to be charged will not attain the desired state of charge within the ½-hour period. It can then be assumed that, if the battery B reaches the predetermined terminal voltage within the ½-hour initial period, so that contacts 31 are open when switch 12 opens, the battery either had an unusually high initial state of charge, and therefore is now satisfactorily charged, or has excessively sulfated plates, a defective condition causing an unusually rapid increase in terminal voltage during charging. The usual load test, carried out with any suitable storage battery test, will accordingly indicate conclusively whether the battery is good or bad. Hence, area 28 is labeled to instruct the operator to "Make Load Test" if pointer 27 stops at area 28.

The second predetermined time period may be set to terminate after one hour and the charging rate made such that normal batteries presented for charging will attain the desired predetermined terminal voltage at some time within the second ½-hour period of charging i.e., the ½ hour remaining in the second predetermined time period subsequent to termination of the first predetermined time period. Hence, for such batteries, circuit 34 will de-energize winding 33, causing contacts 31 to open, at a time when pointer 27 is in the colored area 29 on facing portion 26, which area is labeled "Good Battery." Accordingly, if circuit 34 acts to interrupt charging during the second ½-hour of charging, the operator observes from pointer 27 and labeled area 29 that the battery requires no further servicing.

If circuit 34 does not act to interrupt charging during the second ½-hour of charging, then the timer motor 10 continues to run until follower 19 engages in notch 24. Switch 11 then opens, terminating charging, and pointer 27 stops in the colored area 30. Under these conditions it is most likely that the battery is fatally defective. There is, however, some possibility that the initial state of charge of the battery was so low that even the full hour of charging was not adequate, the battery being otherwise satisfactory. A conventional load test will distinguish between these two situations. Hence, area 30 is labeled "Make Load Test" and the operator need only follow these instructions to determine whether the battery should be replaced or subjected to additional charging.

Control circuit 34 includes a voltage divider comprising resistances 35—37, the voltage divider being connected across battery B via conductors 38 and 39. A first transistor 40, of the PNP type, has its emitter connected to conductor 38 via conductors 41 and 42, and its collector connector to conductor 39 via resistance 43, conductor 44 and conductor 45. The series combination of a resistance 46 and a Zener diode 47 is connected between the output terminal of the voltage divider and the base of transistor 40. A second PNP type transistor 48 is employed, the emitter thereof being connected to conductor 42 via resistance 49. The collector of transistor 48 is connected via conductor 50 to one terminal of winding 33 of relay 32, the other terminal of winding 33 being connected to conductor 45. Thus, relay winding 33 is connected to the output of rectifier 6 and similarly across the battery B via transistor 48.

By conductor 51, the base of transistor 48 is connected directly to the collector of transistor 40. A resistance 52 is connected between the collector of transistor 48 and a point on the voltage divider between resistances 35 and 36, forming a positive feedback circuit. A manual or other suitable switch 53 is connected in conductor 38. The voltage divider comprising resistances 35—37 is effective to derive from battery B a voltage the magnitude of which is related to the terminal voltage of the battery. The voltage so derived is applied to the Zener diode 47, the Zener diode is so poled as to receive current from the battery only in the inverse (high resistance) direction. Thus, the voltage applied to the Zener diode will be inadequate to cause the diode to conduct if the terminal voltage of battery B is below a predetermined value to which the control circuit 34 is designed to respond.

Assuming that switch 53 is closed and that the voltage derived from the voltage divider and applied to the Zener diode is below the predetermined value, transistor 40 is fully nonconductive and transistor 48 is fully conductive. Since transistor 48 conducts, current flows through the relay winding 33 so that relay 32 is energized and contacts 31 are closed, allowing current to flow from the A.C. source to the primary winding 2 of transformer 1. As charging proceeds, and the terminal voltage of the battery increases, the voltage derived from the voltage divide and applied to Zener diode 47 increases until it reaches the predetermined critical value. The Zener diode then becomes conductive. At the instant the diode becomes conductive, the current therethrough is just sufficient to make transistor 40 conductive.

The value of resistance 43 is so selected that the potential at the base of transistor 48 is at the edge of saturation for that transistor. Hence, a slight flow of current through transistor 40 causes the emitter-to-base potential of transistor 48 to decrease, resulting in a decrease in conductivity of transistor 48.

The positive feedback circuit provided through resistance 52 is such that, as transistor 48 becomes less conductive, less current flows through resistance 52 and a greater voltage is accordingly applied from the voltage divider to the Zener diode 47. The emitter-to-collector current of transistor 40 therefore increases still further, resulting in a further decrease in the potential at the base of transistor 48. Transistor 48 is thus positively caused to become completely nonconductive and all current flow in winding 33 of relay 32 therefore ceases and the movable contact of the relay returns under its spring bias to its normally open position.

If circuit 34 acts in the manner just described to open contacts 31 at a time when switch 12 is still closed (that is, within the first ½-hour period when time switch 9 is constructed as hereinbefore described) current will continue to flow in the charging circuit, and driving motor 10 of time switch 9 will continue to be energized, until the first ½-hour period expires and switch 12 opens. Charging will then terminate and motor 10 will be de-energized with the position of knob 16 being such that pointer 27 stops within colored area 28. Assuming, however, that circuit 34 does not act to open contacts 31 until after expiration of the first ½-hour period of operation of time switch 9, then switch 12 will already have been opened when contacts 31 open and opening of the latter contacts is effective to terminate charging and stop driving motor 10. In that event, knob 16 will have turned to a position such that pointer 27 is within colored area 29. Finally, it will be understood that the terminal voltage of battery B may not increase to the predetermined value to which circuit 19 is to respond even during the second ½-hour period of charging. In that event, operation of the time switch to open switch 11 is effective to terminate charging and to de-energize motor 10 and, when this occurs, pointer 27 will indicate colored area 30.

From the foregoing, it will be clear that the present invention employs the time switch, in conjunction with the indicia displayed on casing portion 26, and also in conjunction with the operation of control circuit 34 and relay 32, not only to terminate the charging operation but also to instruct the operator as to how the battery B should be handled.

*It is obvious to those skilled in the art that the indicia could be displayed on knob 16 instead of on the casing portion 26, and when so displayed would cooperate with a pointer 27 placed on the side of the casing instead of on the knob. This alternate arrangement of pointer and indicia would then provide the same meaningful instructions to the operator.*

In the embodiment of FIG. 1, circuit 34, responding to the terminal voltage of the battery and operating as an actuating circuit for normally open relay 32, is activated as soon as both of the series-connected switches 11 and 12 are closed. Such closing of switches 11 and 12 of course results from manual adjustment of knob 16 to bring pointer 27 to the Start position. In the embodiment shown in FIG. 4, however, one of the two switches of the time switch is employed to maintain the voltage responsive relay actuating circuit in deactivated condition until after a predetermined initial time period of charging has been completed. In this embodiment, the contacts of the relay and that switch of the time switch which is last to open are connected in the charging circuit in series, the arrangement being such that, once the initial time period of charging has been completed, either the relay or the time switch can act to interrupt charging, depending upon whether or not the battery being charged attains the predetermined terminal voltage before expiration of the second time period determined by the time switch.

Here, transformer 1, conductors 4 and 5, rectifier 6, conductors 7 and 8, battery B, and the components of relay actuating circuit 34 remain precisely as described hereinbefore with reference to FIG. 1. The normally open contacts 31' of relay 31, however, are interposed in conductor 4 in series with switch 11' of the time switch, it being understood that switch 11' is the last-to-open switch of the time switch. Switch 12' of the time switch is interposed between resistance 46 and the output terminal of the voltage divider, and the time switch is so constructed that switch 12' is normally open and is actuated to closed position by the cam means of the time switch only at the end of the first period of time determined by the time switch. Thus, for purposes of illustration, switch 12' can be closed by the time switch at the end of the first ½ hour and switch 11' opened at the end of the second ½ hour. It is to be understood that, in the embodiment schematically illustrated in FIG. 4, the time switch is provided with a knob in the fashion illustrated in FIG. 3 and the battery charger includes the casing portion 26 provided with colored areas 28—30 to be indicated by pointer 27, as hereinbefore described.

Since switch 12' is interposed in series with Zener diode 47, no current can flow through the diode until the time switch acts to close switch 12'. Thus, under the assumed design conditions, the voltage derived from the battery via the voltage divider cannot be applied to the Zener diode during the first ½-hour period following the initiation of operation of the charger by movement of knob 16 to its Start position. At the end of the first ½-hour of charging, closing of switch 12' results in activation of circuit 34. If, at that time, the terminal voltage of battery B has reached the predetermined value, circuit 34 will function in the manner hereinbefore described to deenergize winding 33 of the relay, opening contact 31' and immediately terminating charging. Under those circumstances, pointer 27 would indicate colored area 28. Assuming, on the other hand, that the battery has not attained the predetermined terminal voltage to which circuit 19 is to respond, contacts 31' will remain closed, following closing of switch 12', because circuit 34 will function to maintain relay winding 33 energized. Then, occurrence of the predetermined terminal voltage of the battery during the second ½-hour of charging provided by the time switch will result in de-energization of winding 33, and opening of contact 31', so that charging would terminate at a time during the second ½-hour of charging when pointer 27 indicates colored area 29. Should the battery B not attain the predetermined terminal at any time within the entire one-hour period, the time switch will then terminate charging by opening switch 11', in which event pointer 27 will come to rest at colored area 30.

Figure 4:
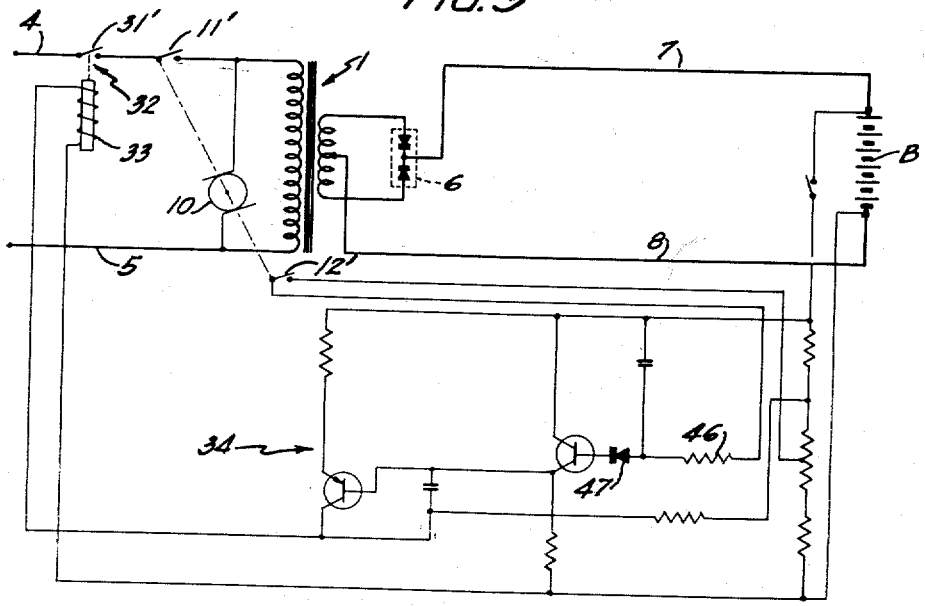
FIG. 4 is a schematic diagram of a battery charger constructed in accordance with a second embodiment of the invention.

It is thus seen that the embodiment of FIG. 4, while functioning in a somewhat different manner than that of FIG. 1, still serves to employ the time switch, in conjunction with the indicia on casing portion 26 and the operation of relay actuating circuit 34, not only to properly terminate charging, but also to instruct the operator in the proper handling of battery B.

While, in both the embodiment of FIG. 1 and that of FIG. 4, the particularly advantageous transistor circuit 34 has been disclosed, it will be understood that, where desired, other types of relay actuating circuits can be employed. Though especially useful forms of indicia employed in conjunction with time switch knob 16 have been illustrated, those skilled in the art will recognize that colored areas 28—30 can be arranged differently than shown in FIG. 3 and can be provided with different legends than those used in the illustrative embodiments, so long as the knob, pointer and indicia serve to instruct the operator properly as to further servicing of the battery once charging has terminated. Where desirable, the battery charger hereinbefore described can be provided with a pilot light to indicate positively when charging has been terminated. This can be done, for example, by connecting a neon glow lamp across the series combination of switches 11 and 12, FIG. 1. Alternatively, a single incandescent lamp can be employed, connected across conductors 4 and 5 via two circuits in parallel, one including a back contact provided on switch 11, and the other including back contacts provided on switch 12 and relay 31, the latter two back contacts being connected in series. Still other changes and modifications are possible without departing from the scope of the invention as defined in the appended claims.

What is claimed is:

1. In a battery charger, the combination of a charging circuit for connection to at least one battery to supply charging current thereto; a timing device comprising drive means placed in operation by initiation of operation of said charging circuit, said timing device being operative to define a shorter time period of charging via said charging circuit and a longer, smultaneously initiated, subsequently terminated time period of charging via said charging circuit; control means operatively connected to said charging circuit to control the same; an actuating circuit responsive to terminal voltage of the battery being charged and operatively connected to said control means to actuate the same when the terminal voltage of the battery reaches a predetermined value, the combination of said timing device and control means being operative to terminate charging subsequent to said shorter time period when the terminal voltage of the battery being charged attains said predetermined value during said longer time period and said timing device being operative to terminate charging at the end of said longer period when the terminal voltage of the battery fails to reach said predetermined value; indicia displayed for view by the operator [,] *; pointer means operatively arranged to cooperate with said indicia;* and means driven by said drive means and [cooperating with] *operatively arranged to effect relative movement between said pointer means and* said indicia to indicate to the operator the proper handling of the battery subsequent to termination of charging.

2. In a battery charger, the combination of a charging circuit for connection to at least one storage battery to supply charging current thereto; a timing device comprising an electrical driving motor and two switches, said timing device being constructed and arranged to accomplish actuation of one of said switches at the end of a shorter time period and actuation of the other of said switches at the end of a longer time period with said longer time period terminating subsequent to said shorter time period; control means operatively connected to said charging circuit to control the same; an actuating circuit connectable to the battery to be charged and constructed to respond to the terminal voltage thereof to actuate said control means when the terminal voltage of the battery reaches a predetermined value, said one switch and said control means being operatively connected to effectively terminate charging subsequent to said shorter time period but before the end of said longer time period when the terminal voltage of the battery reaches said predetermined value, said other switch being operatively connected to effectively terminate charging at the end of said longer time period; indicia carried by the battery charger and displayed for view by the operator [,] *; pointer means operatively arranged to cooperate with said indicia,* and means driven by said driving motor and [cooperating with] *operatively arranged to effect relative movement between said pointer means and* said indicia to indicate to the operator the proper handling of the battery in accordance with the circumstances of termination of charging thereof by said switches and control means, said motor being connected to be de-energized whenever charging is effectively terminated by said switches and control means.

3. A battery charger in accordance with claim 2 and wherein said two switches are connected in said charging circuit in series, said control means includes contacts connected in parallel with said one switch and said timing device is constructed to open said one switch at the end of said shorter time period.

4. A battery charger in accordance with claim 2 and wherein said control means is an electromagnetic relay having normally open contacts and an actuating winding, and said actuating circuit is constructed and arranged to maintain said actuating winding energized, causing the contacts of said relay to be closed, only so long as the terminal voltage of the battery being charged is below a predetermined value.

5. A battery charger in accordance with claim 2 and wherein said one switch is operatively connected to said actuating circuit to maintain the latter deactivated so long as said one switch is open, and said timing device is operative to close said one switch only at the end of said shorter time period.

6. A battery charger in accordance with claim 5 and wherein said control means is an electromagnetic relay and said other switch and the contacts of said relay are connected in said charging circuit in series.

7. A battery charger in accordance with claim 2 and wherein said timing device includes cam means for actuating said switches and said means driven by said driving motor includes a knob by which said cam means can be adjusted manually, *said knob being adapted to carry said pointer means.*

8. In an automatic battery charger, the combination of a charging circuit for connection to at least one storage battery for supplying charging current thereto; a timing device comprising an electrical driving motor and two switches; switching means arranged to normally interrupt charging by said charging circuit and capable of actuation to charging circuit completing condition; an actuating circuit connectable to the battery to be charged and constructed to respond to the terminal voltage thereof to actuate said switching means and maintain the same in charging circuit completing condition only so long as the terminal voltage of the battery is below a predetermined value, one switch of said timing device being connected in said charging circuit and the other switch of said timing device being so connected to said actuating circuit as to deactivate the same when said other switch is open and activate the same when said other switch is closed, said timing device being constructed to maintain said other switch closed only after the end of a shorter time period and to subsequently open said one switch at the end of a longer time period, said electrical driving motor being connected to receive current only so long as said switching means is in charging circuit completing condition and said one switch is closed; indicia carried by the battery charger and displayed for view by the operator [,]; *pointer means operatively arranged to cooperate with said indicia;* and means responsive to the operation of said driving motor for [cooperation with] *effecting relative movement between said pointer means and* said indicia to indicate to the operator the proper handling of the battery in accordance with the circumstances of termination of charging thereof by said switches and switching means.

9. In a battery charger of the type described the combination of a charging circuit connectable to a source of current and to at least one storage battery to supply charging current thereto; a timing device including two switches and an electrical driving motor, said motor being connected to said charging circuit and said switches being connected in series in said charging circuit between said motor and the source of current; a relay having contacts connected to said charging circuit in parallel with one of said switches; and means responsive to a variable condition of the battery for actuating said relay.

10. In a battery charger of the type described, the combination of a charging circuit connectable to a source of current and to at least one storage battery to be charged to supply charging current thereto; a relay having contacts connected in said charging circuit; a control circuit operatively connected to said relay and responsive to a variable condition of the battery; and a timing device including two switches, an electrical driving motor, and means operatively associated with said switches for actuating the same in response to operation of said motor, said motor being connected to said charging circuit, one of said switches being connected in said charging circuit between said motor and the source of current, and the other of said switches being connected in said control circuit, operation of said timing device causing said switches to be maintained in predetermined operative positions for selected time periods.

References Cited by the Examiner

The following references, cited by the Examiner, are of record in the patented file of this patent or the original patent.

UNITED STATES PATENTS 1,835,386 12/31 Geiger ---------- 320—38

LLOYD McCOLLUM, *Primary Examiner.*